(12) United States Patent
Osa

(10) Patent No.: US 8,909,974 B2
(45) Date of Patent: Dec. 9, 2014

(54) DATA PROCESSING APPARATUS, DATA PROCESSING METHOD AND RECORDING MEDIUM

(75) Inventor: Kinya Osa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 13/316,389

(22) Filed: Dec. 9, 2011

(65) Prior Publication Data

US 2012/0159231 A1 Jun. 21, 2012

(30) Foreign Application Priority Data

Dec. 16, 2010 (JP) .................................. 2010-280873

(51) Int. Cl.
*G06F 1/04* (2006.01)
*G06K 9/00* (2006.01)

(52) U.S. Cl.
CPC ............ *G06K 1/325* (2013.01); *G06K 9/00986* (2013.01)

USPC ........... 713/601; 713/320; 713/322; 713/600; 713/500; 713/501; 713/502; 713/503

(58) Field of Classification Search
USPC .......................... 713/320, 322, 500–503, 600
See application file for complete search history.

(56) References Cited

FOREIGN PATENT DOCUMENTS

| JP | 6-202754 A | 7/1994 |
| JP | H10-240371 A | 9/1998 |
| JP | 2003-58271 A | 2/2003 |

*Primary Examiner* — M Elamin
(74) *Attorney, Agent, or Firm* — Canon USA, Inc. IP Division

(57) ABSTRACT

A data processing apparatus comprising: a gate unit connected to an input or an output of a processing unit and configured to cut off the data input and output; a control unit configured to control a supply of clock to the processing unit; and an instruction unit configured to give an instruction for the clock control to the control unit, wherein the control unit controls the gate unit and controls the clock supplied to the processing unit based on an instruction from the instruction unit, whereby securing a higher power saving effect.

13 Claims, 21 Drawing Sheets

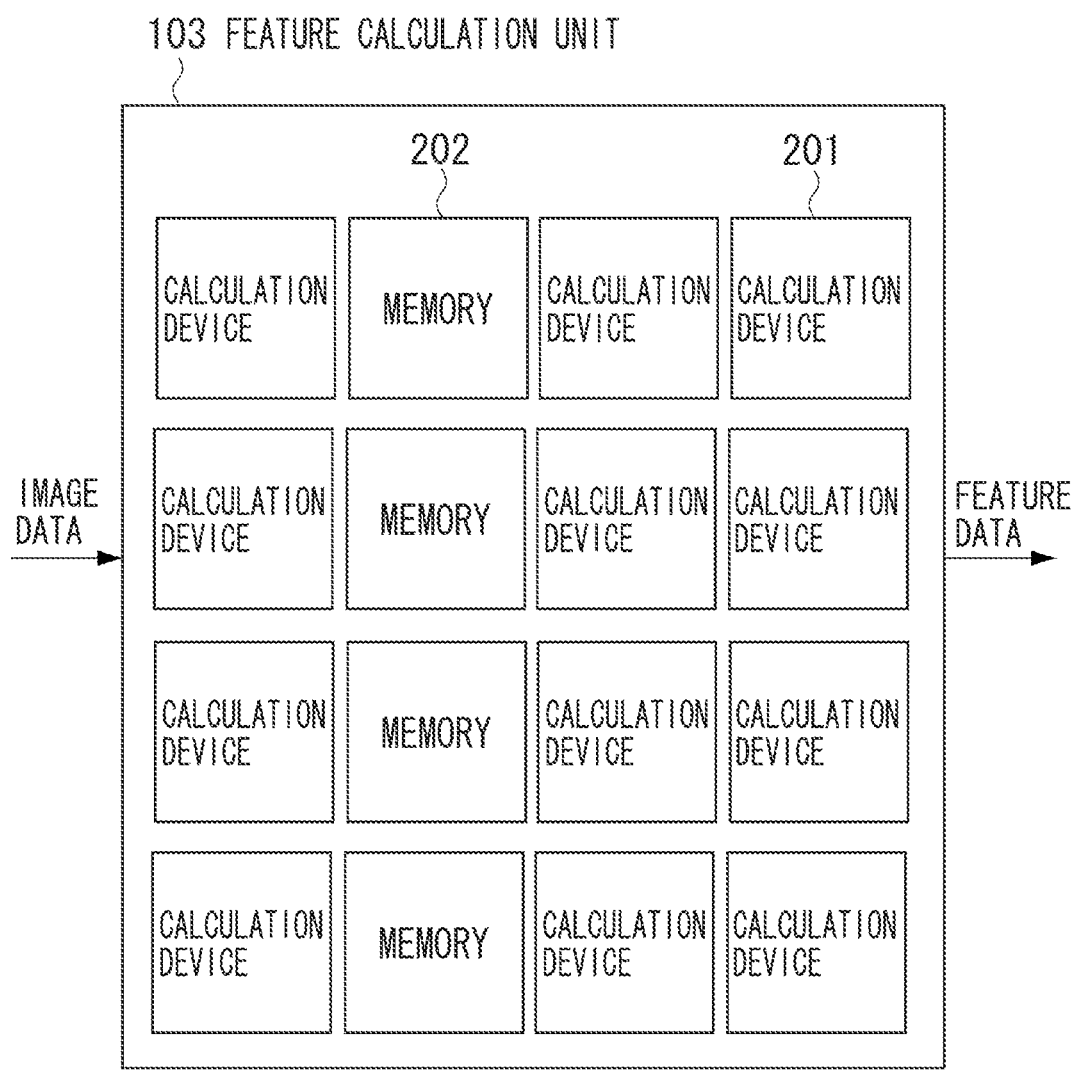

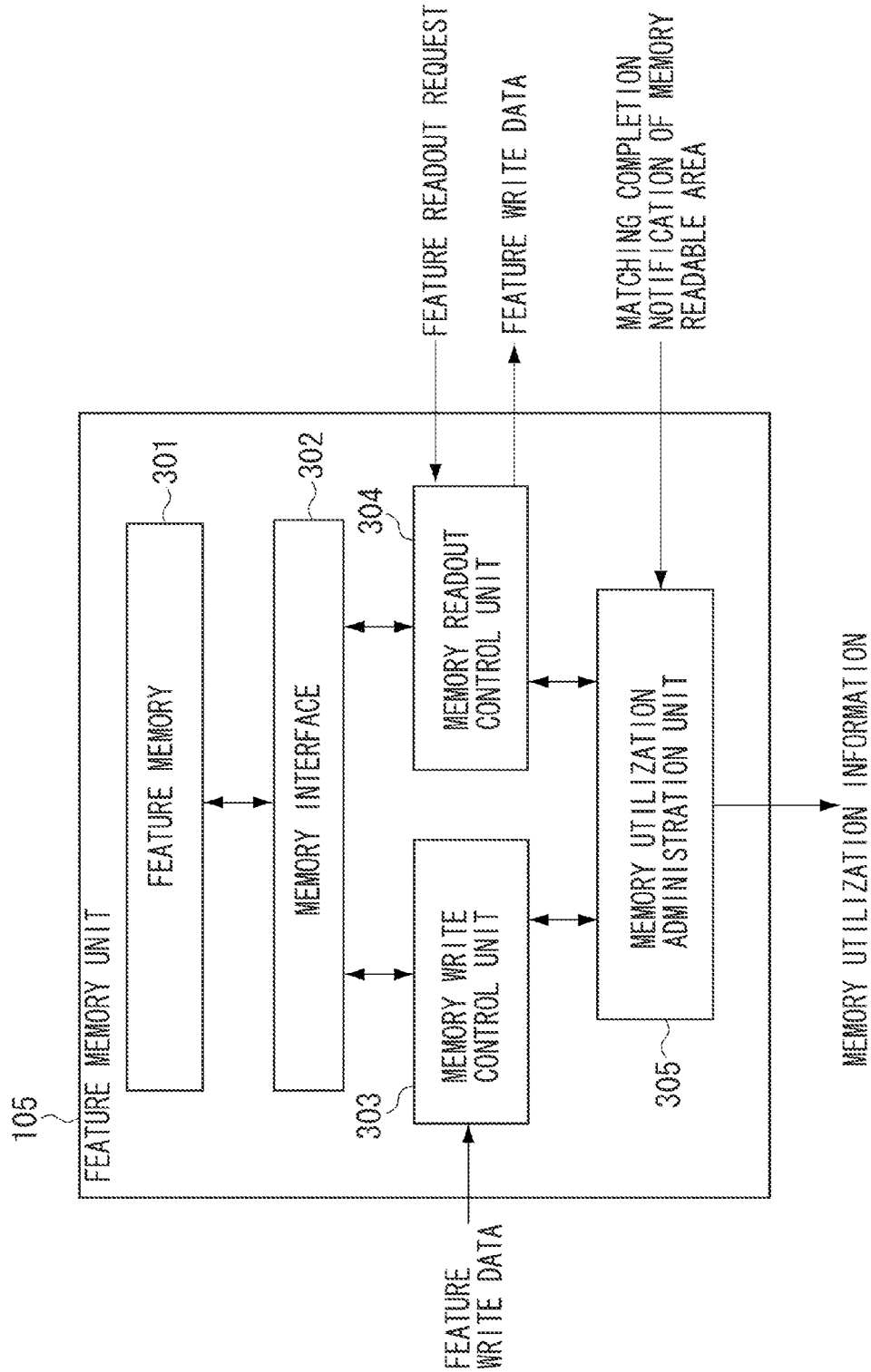

WRITE INTO
FEATURE MEMORY

WRITABLE AREA AND
READABLE AREA

RING BUFFER
ACTIVITY

HANDSHAKE SIGNAL

TIMING CHART OF HANDSHAKE SIGNAL

STATE TRANSITION DIAGRAM
OF CLOCK CONTROL STATE MACHINE

FIG. 11B

CLOCK CONTROL STATE MACHINE
OUTPUT SIGNAL VALUE

| STATE | CLOCK ENABLE SIGNAL VALUE | INPUT GATE UNIT CONTROL VALUE OUTPUT GATE UNIT CONTROL VALUE |
|---|---|---|
| OPERATION STATE | 1 (ON) | 1 (ON) |
| INPUT/OUTPUT CUT-OFF STATE 1 | 1 (ON) | 0 (OFF) |
| CLOCK OFF STATE | 0 (OFF) | 0 (OFF) |
| INPUT/OUTPUT CUT-OFF STATE 2 | 1 (ON) | 0 (OFF) |

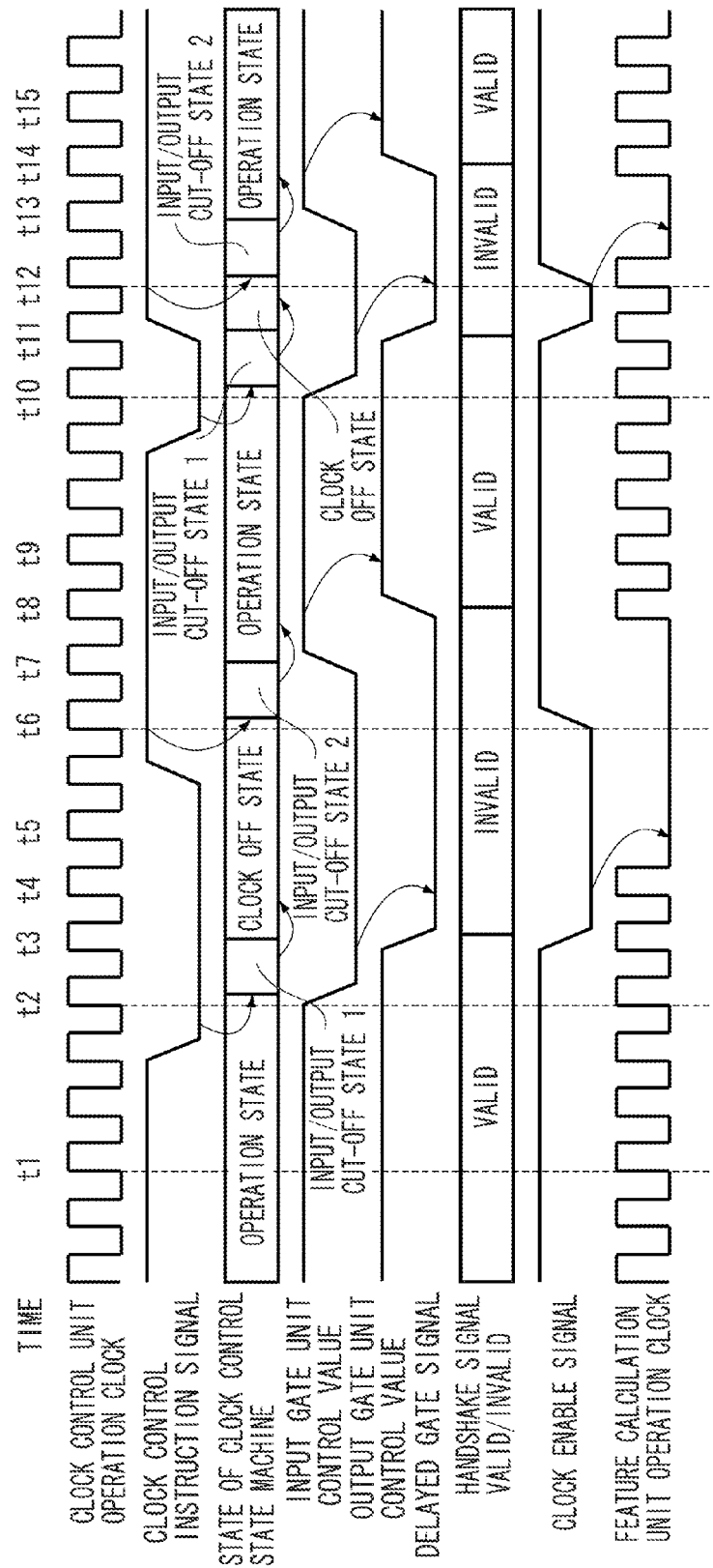

STATE TRANSITION DIAGRAM OF CLOCK CONTROL STATE MACHINE

FIG. 17B

CLOCK CONTROL STATE MACHINE
OUTPUT SIGNAL VALUE

| STATE | CLOCK ENABLE SIGNAL VALUE | INPUT GATE UNIT CONTROL VALUE OUTPUT GATE UNIT CONTROL VALUE |
|---|---|---|
| OPERATION STATE | 1 (ON) | 1 (ON) |
| CLOCK OFF STATE | 0 (OFF) | 0 (OFF) |

DATA PROCESSING APPARATUS, DATA PROCESSING METHOD AND RECORDING MEDIUM

BACKGROUND OF THE INVENTION

1. Field of the Invention

The present invention relates to a data processing apparatus, a data processing method and a recording medium, more particularly to a technology suitable for use in reducing power consumption.

2. Description of the Related Art

Conventionally, there has been known a technology for reducing power consumption by stopping clock supply to a given functional module when the functional module is not in use (e.g., Japanese Patent Application Laid-Open No. 6-202754). On the other hand, also when the functional module is in use, by stopping the clock supply to the functional module corresponding to a clock control request signal, a higher power consumption effect can be achieved.

However, if the supply of clock is stopped suddenly during use of the functional module, matching in data transfer between input and output to/from the module might not be maintained, which may induce a malfunction. Japanese Patent Application Laid-Open No. 2003-58271 discusses a technology for stopping clock during use while avoiding such a malfunction. The technology discussed by Japanese Patent Application Laid-Open No. 2003-58271 includes a clock generation unit, a first module for asserting a clock control request signal and a plurality of second modules which respond to the clock control request signal and assert a clock control acknowledge signal. The second module responds to an asserted clock control request signal and after a processing being currently executed terminates, stops a subsequent processing and asserts the clock control acknowledge signal. When all the clock control acknowledge signals from one or plural second modules are asserted, the clock generation unit changes clocks supplied to the second module selectively.

When a processing being currently executed terminates after a request for stopping the clock is dispatched, the technology discussed by Japanese Patent Application Laid-Open No. 2003-58271 takes a procedure of stopping a subsequent processing and sending back the acknowledge signal. Thus, execution of this procedure takes much time depending on the content of a processing being currently executed. When it is intended to stop the clock delicately during an operation of the functional module, the time required for the execution of the procedure discussed in Japanese Patent Application Laid-Open No. 2003-58271 restricts the lower limit of a clock down period, whereby keeping the power saving effect on a low level.

SUMMARY OF THE INVENTION

According to an aspect of the present invention, an apparatus comprises: a processing unit configured to process and output input data; a gate unit connected to an input or an output of the processing unit and configured to cut off data input and output; a control unit configured to control a supply of clock to the processing unit; and an instruction unit configured to provide a clock control instruction for clock control, wherein the control unit controls the gate unit and the clock based on an instruction from the instruction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating a detailed configuration of a feature calculation unit.

FIG. 3 is a diagram illustrating a detailed configuration of a feature memory unit.

FIGS. 11A and 11B are diagrams illustrating a state transition of a clock control state machine and an output signal value.

FIG. 12 is a diagram illustrating a flow of operation clock control.

FIGS. 17A and 17B are diagrams illustrating a state transition of a clock control state machine and an output signal value.

DESCRIPTION OF THE EMBODIMENTS

Various exemplary embodiments, features, and aspects of the invention will be described in detail below with reference to the drawings.

Figure 1:
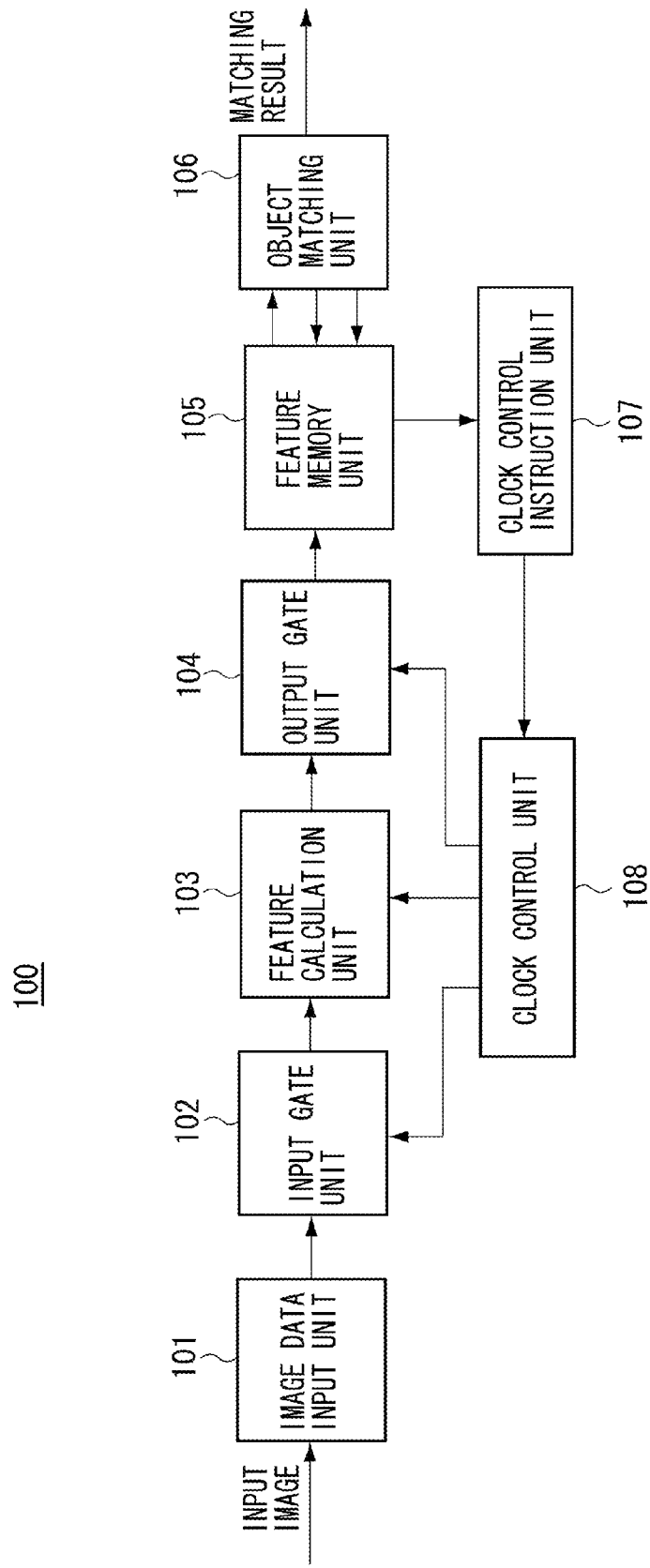
FIG. 1 is a diagram illustrating an example of the functional configuration of an image recognition apparatus.

Hereinafter, the configuration of a first exemplary embodiment of the present invention will be described with reference to FIG. 1. FIG. 1 is a block diagram illustrating an example of the functional configuration of an image recognition apparatus 100 which recognizes an object within an image. An image data input unit 101 fetches an input image from an image sensor, a communication network or a memory and inputs the image into the image recognition apparatus 100. A feature calculation unit 103 calculates a feature (e.g., luminance information and edge information) suitable for the recognition processing of the image input through the image data input unit 101. The feature calculation unit 103 is connected to the image data input unit 101 via an input gate unit 102 and its output is connected to a feature memory unit 105 via an output gate unit 104.

The feature memory unit 105 stores feature data calculated by the feature calculation unit 103, which is necessary for matching for recognizing an object. The object matching unit 106 reads out feature data stored in the feature memory unit 105, executes matching processing checking whether or not the image is the object, and outputs a matching result. The matching processing by the object matching unit 106 needs to be carried out by scanning the input image while changing a matching position. Therefore, when the matching processing on the feature data stored in the feature memory unit 105 is finished, a memory readout-unit matching completion notification is sent from the object matching unit 106 to the feature memory unit 105 to start the matching of a next position.

A clock control instruction unit 107 receives memory utilization information from the feature memory unit 105 and sends a clock control instruction signal to a clock control unit 108. The clock control unit 108 controls clock supplied to the feature calculation unit 103, an input gate unit 102 and an output gate unit 104 according to a received clock control instruction signal. In the meantime, clock necessary for operation of other respective units is supplied to each unit in addition to the feature calculation unit 103.

Next, a detailed configuration example of each of the units shown in FIG. 1 will be described with reference to FIGS. 2 to 11. FIG. 2 is a block diagram illustrating a detailed configuration example of the feature calculation unit 103, which is constituted of a plurality of calculation devices 201 and a plurality of memories 202. The image data input to the feature calculation unit 103 is calculated using calculation devices 201 and memories 202 and then, its result is output as feature data. The calculation device 201 and the memory 202 may be specialized for calculation of a specific feature or may be configured to be able to calculate various kinds of the features by means of a general-purpose calculation device 201 and memory 202.

FIG. 3 is a block diagram illustrating a detailed configuration example of a feature memory unit 105, which includes a feature memory 301, a memory interface 302, a memory write control unit 303, a memory readout control unit 304 and a memory utilization administration unit 305. The feature memory 301 stores a feature of a quantity more than necessary for executing the object matching processing. The memory interface 302 is connected to the feature memory 301 to arbitrate an access to the feature memory 301 between the memory write control unit 303 and the memory readout control unit 304.

The memory write control unit 303 receives feature data output by the feature calculation unit 103 and requests the memory interface 302 to write the feature data into an appropriate address on the feature memory 301. The memory readout control unit 304 receives a feature readout request output by the object matching unit 106 and requests the memory interface 302 to read out the appropriate address on the feature memory 301. After that, the memory readout control unit 304 outputs the data read out from the feature memory 301 via the memory interface 302 to the object matching unit 106. The memory write control unit 303 and the memory readout control unit 304 are administered and controlled according to a ring buffer control method shown in FIG. 4 by the memory utilization administration unit 305.

Figure 4A:
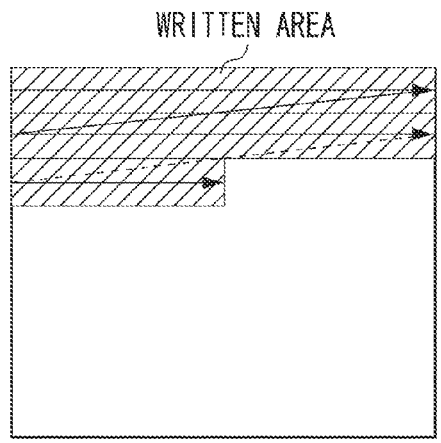
FIGS. 4A, 4B, 4C are diagrams illustrating a ring buffer control for the feature memory.

The ring buffer control of the feature memory 301 will be described with reference to FIG. 4. FIG. 4A is a diagram illustrating feature data write processing into the feature memory and the feature data is written into the feature memory 301 in outputting order from the feature calculation unit 103. The write address into the feature memory 301 is controlled by the memory write control unit 303.

Figure 4B:
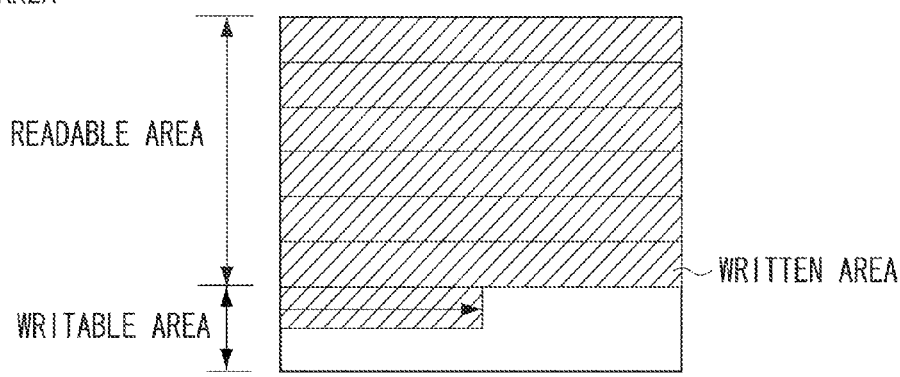

FIG. 4B is a diagram illustrating a writable area and a readable area of the feature memory. For the object matching unit 106 to collate the object, it is necessary to read out feature data of more than a specific amount. Thus, when the amount of written data into the feature memory exceeds an amount necessary for the readout, the readout of the feature data is enabled. Here, a memory area which can be read out is referred to as readable area.

The memory utilization administration unit 305 controls the memory readout control unit 304 not to read out until the amount of the written data into the feature memory reaches an amount necessary for the object matching unit to read out. A section subsequent to the readable area on the feature memory unit 105 is referred to as writable area. Data of the readable area on the feature memory 301 is read out from the object matching unit 106 and at the same time, the feature calculation unit 103 writes data into the writable area on the feature memory 301.

As a matching completion notification of memory readable area, the object matching unit 106 notifies the memory utilization administration unit 305 that the object matching unit 106 has finished readout of data in a current readable area. If a free space of the writable area runs out before the matching completion notification of memory readable area is received, the memory utilization administration unit 305 controls the memory write control unit 303 not to write anymore. When the memory utilization administration unit 305 receives the matching completion notification of memory readable area, it shifts the readable area to set a next readable area.

Figure 4C:
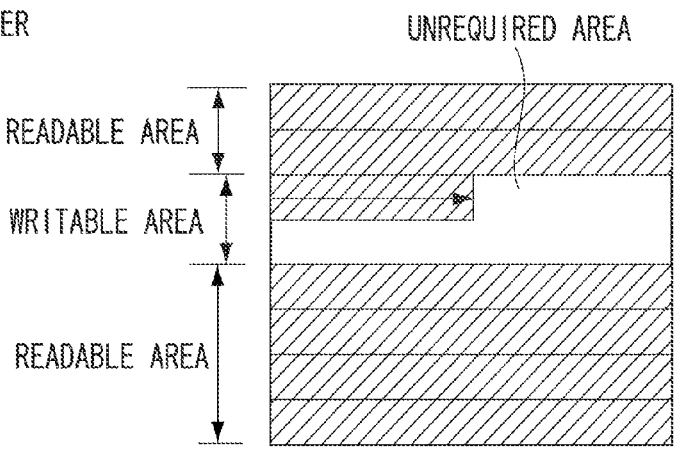

FIG. 4C is a diagram illustrating a ring buffer operation of the feature memory unit 105. The readable area shifts and when it surpasses an end of the memory, the surpassing amount is sent back to a head of the memory so that an area for it is set. The memory utilization administration unit 305 executes such ring buffer control and as information regarding the memory utilization, outputs and sends information about whether or not there is any free space in the feature writable area, to the clock control instruction unit 107.

Although FIG. 4 illustrates an example of the ring buffer control, the administration method of the memory utilization is not restricted to the ring buffer method but double buffer method or other method may be used. Although according to the present exemplary embodiment, a feature data output by the feature calculation unit 103 is written into the feature memory 301 as it is, for the sake of the object matching unit 106, the feature data may undergo further calculation before being stored into the memory, for example calculation of an integral value of the feature.

Figure 5:
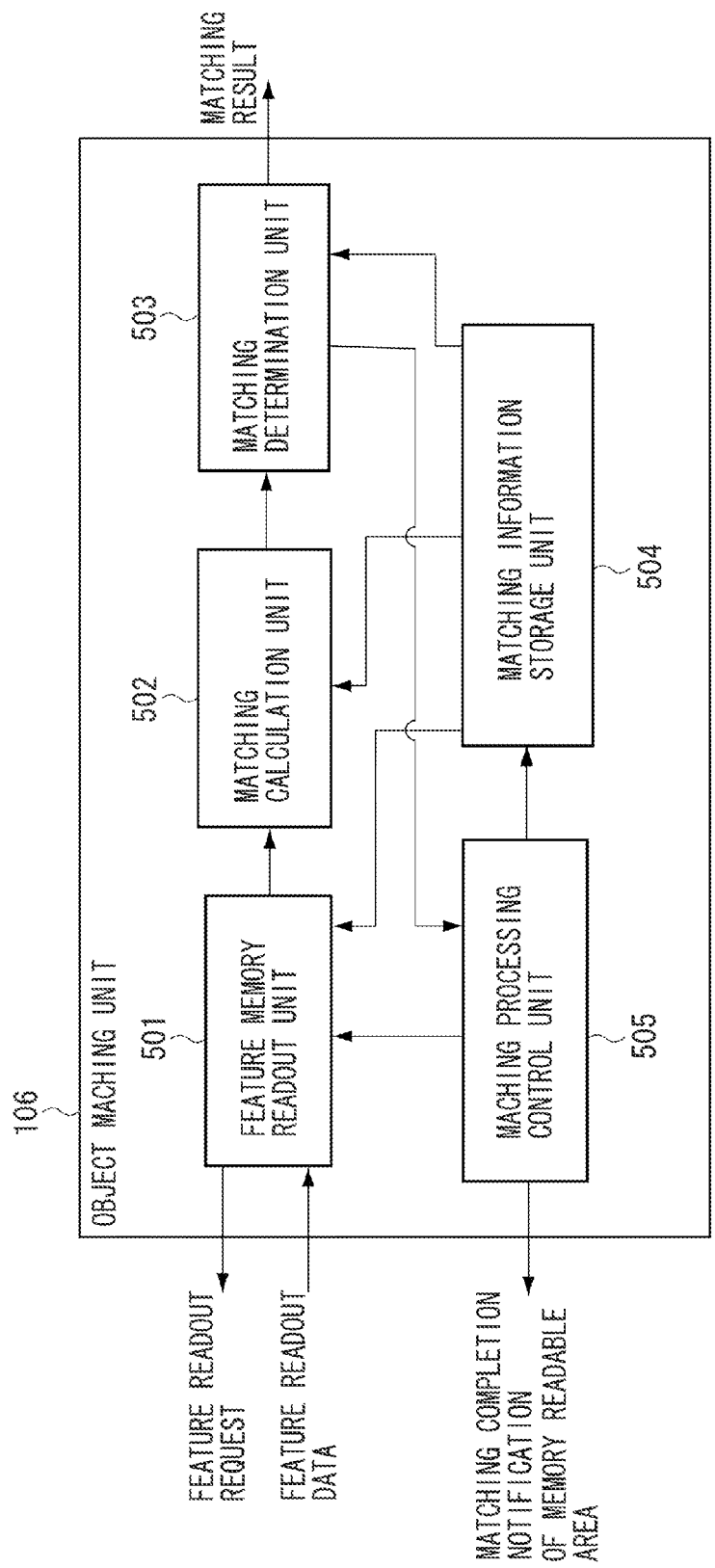
FIG. 5 is a diagram illustrating a detailed configuration of an object matching unit.

FIG. 5 is a block diagram illustrating a detailed configuration example of the object matching unit 106. The object matching unit 106 includes a feature memory readout unit 501, a matching calculation unit 502, a matching determination unit 503, a matching information storage unit 504, and a matching processing control unit 505. The feature memory readout unit 501 reads out feature data from the feature memory unit 105 and supplies the feature data to the matching calculation unit 502. A readout position on the feature memory 301 is calculated using parameter information (dictionary information) for collating an object stored in the matching information storage unit 504. The matching calculation unit 502 carries out matching calculation using data received from the feature memory readout unit 501 and parameter information (dictionary information) received from the matching information storage unit 504 and outputs a matching calculation result to a matching determination unit 503.

The matching determination unit 503 makes determination using a matching calculation result received from the matching calculation unit 502 and the parameter information (dictionary information) received from the matching information storage unit 504 to output a matching result indicating whether or not the object has been matched. To collate the object, the matching information storage unit 504 stores parameter information (dictionary information) for use in the feature memory readout unit 501, the matching calculation unit 502 and the matching determination unit 503.

The matching processing control unit 505 controls the entire object matching unit 106 and instructs the feature memory readout unit 501 to start readout to acquire information on matching determination completion from the matching determination unit 503. Further, the matching processing control unit 505 instructs the matching information storage unit 504 to output appropriate parameter information depending on a progress of the matching processing. The matching processing control unit 505 determines whether or not processing corresponding to the readable area of the feature memory 301 being currently accessed is completed with reference to the matching determination completion information and when the matching determination is completed, outputs the memory readout unit matching completion notification to the feature memory unit 105.

Figure 6:
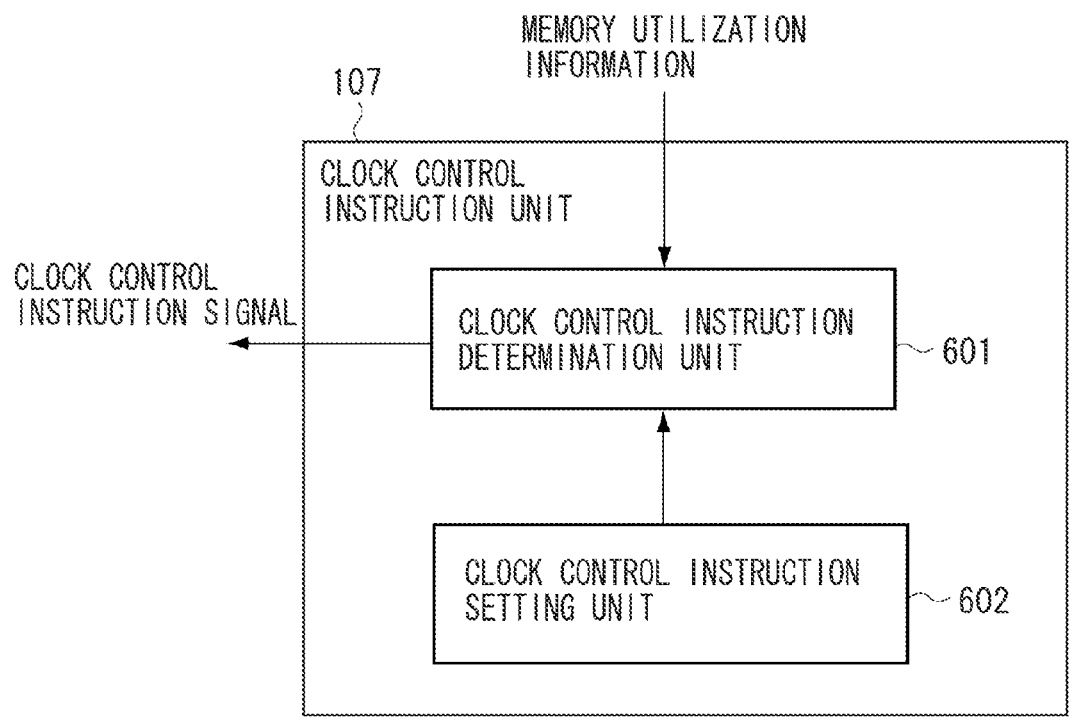
FIG. 6 is a diagram illustrating a detailed configuration of a clock control instruction unit.

FIG. 6 is a block diagram illustrating a detailed configuration example of the clock control instruction unit 107. The clock control instruction unit 107 includes a clock control instruction determination unit 601 and a clock control instruction setting unit 602. The clock control instruction determination unit 601 receives memory utilization information from the feature memory unit 105 and receives setting information from the clock control instruction setting unit 602. From this received information, a clock control instruction signal for instructing on/off of the clock of the feature calculation unit 103 is generated and output to the clock control unit 108. According to this exemplary embodiment, as the memory utilization information, the clock control instruction determination unit 601 receives information about whether or not there is a free space in the writable area of the feature memory 301.

If there is no free space in the writable area of the feature memory 301, a calculation result cannot be stored even if the feature calculation unit 103 calculates more feature. Thus, an instruction signal for turning off the clock of the feature calculation unit 103 is output. On the other hand, if there is a free space in the writable area of the feature memory, an instruction signal for turning on the clock of the feature calculation unit 103 is output. The clock control instruction setting unit 602 makes a setting about whether or not received memory utilization information is used in the clock control instruction determination unit 601. If use of the memory utilization information is set, the clock control instruction signal is controlled depending on the memory utilization information as described above. If no use of the memory utilization information is set, the clock control instruction signal is output so that the clock is always turned on.

Figure 7:
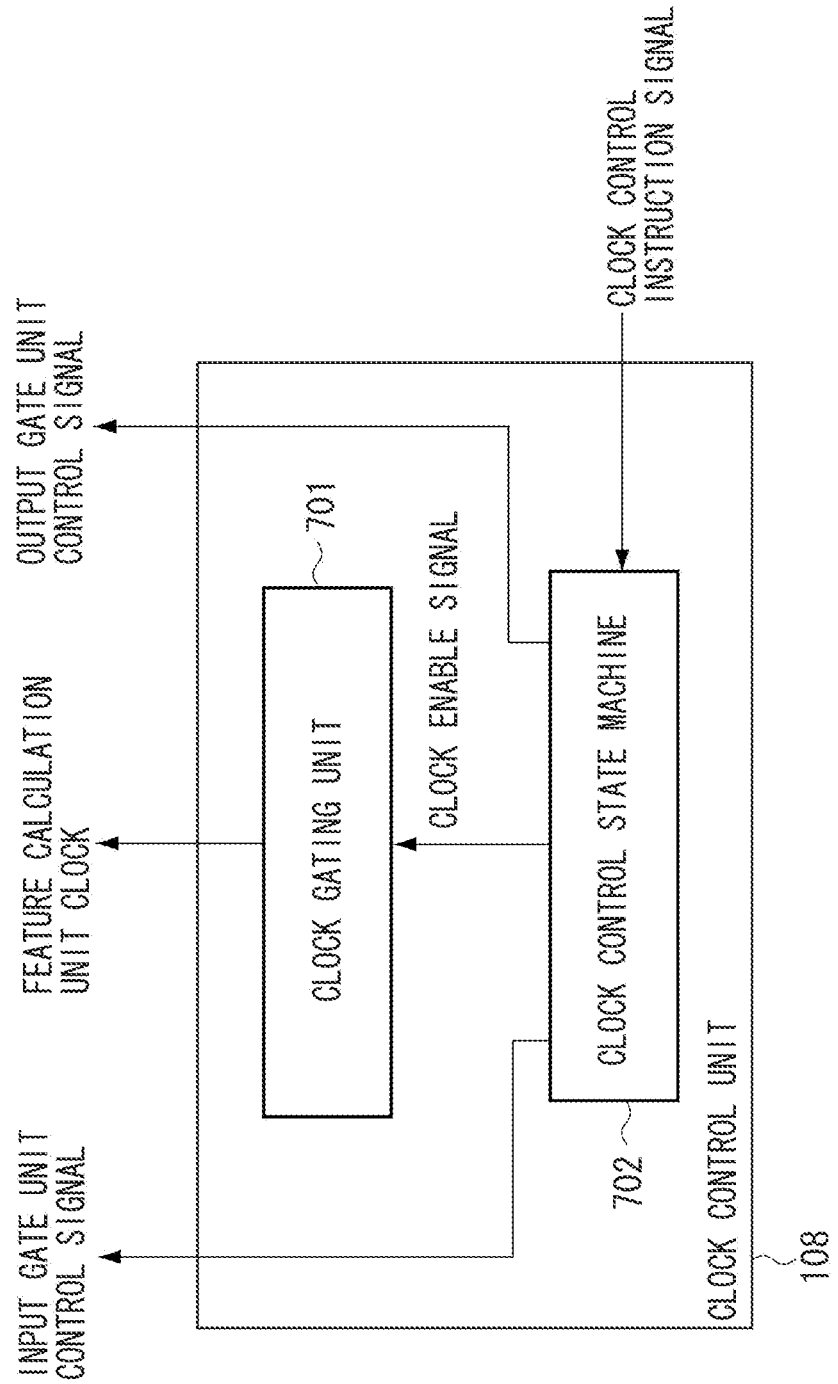
FIG. 7 is a diagram illustrating a detailed configuration of a clock control unit.

FIG. 7 is a block diagram illustrating a detailed configuration example of the clock control unit 108. The clock control unit 108 includes a clock gating unit 701 and a clock control state machine 702. The clock control state machine 702 is operated according to the clock control instruction signal and outputs a clock enable signal, an input gate unit control signal, and an output gate unit control signal, corresponding to its state. The clock gating unit 701 turns on/off a clock supplied to the feature calculation unit 103 in response to a clock enable signal output from the clock control state machine 702. According to this embodiment, a clock enable signal output by the clock control state machine 702 is received by a one-stage flip-flop circuit of the clock gating unit 701. Thus, the clock enable signal changes, so that on/off of the clock is changed after one cycle lapses.

Figure 8A:
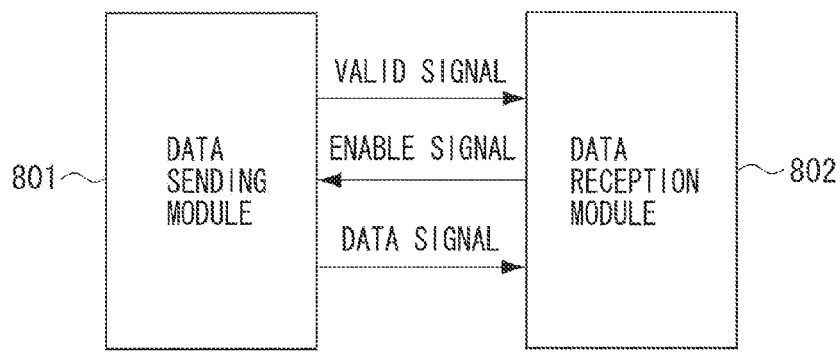
FIGS. 8A and 8B are diagrams illustrating a detail of bidirectional handshake signal.

Next, for explanation of the input gate unit 102 and the output gate unit 104, the bidirectional handshake signal used for both input and output of the feature calculation unit 103 will be described with reference to FIG. 8. FIG. 8A indicates signals for use in transferring data in clock synchronism between a data sending module 801 and a data reception module 802. In FIG. 8A, a valid signal and an enable signal are used as the handshake signal, and a data signal is used to carry transferred data. The valid signal is a signal indicating that the data sending module 801 is outputting valid data to the data signal and when valid='1', valid data is output to the data signal.

The enable signal indicates that the data reception module 802 is capable of fetching data of the data signal and when enable='1', the data can be fetched. Because clock-synchronous data transfer is carried out here, when valid='1' and enable='1' in a certain clock cycle, a data signal value at that time is fetched into the data reception module 802.

Figure 8B:
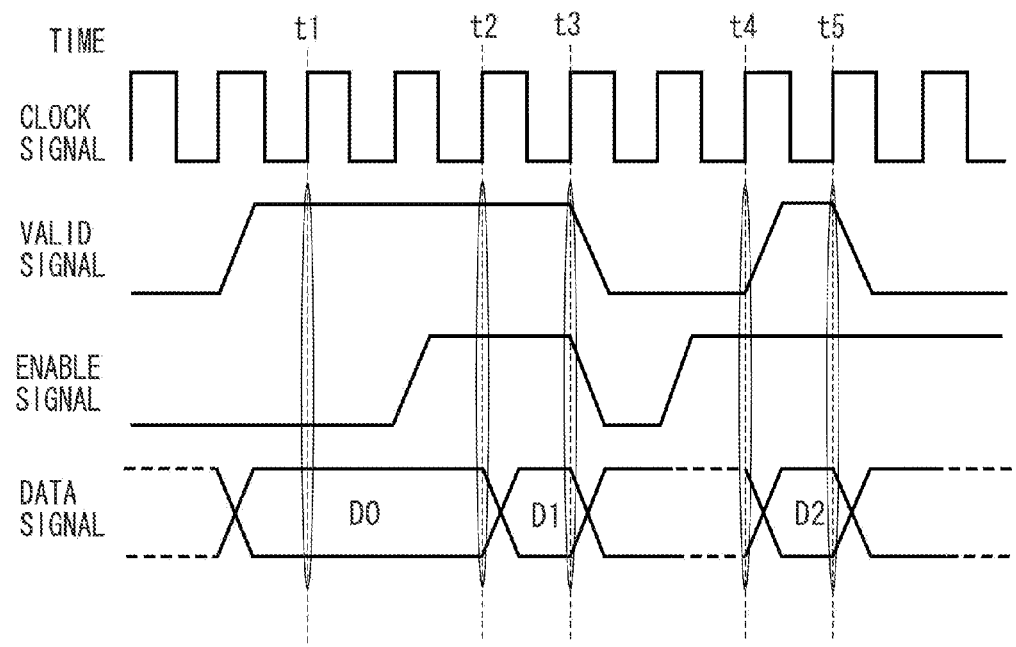

FIG. 8B indicates an example of a timing chart in a case of data transfer using the bidirectional handshake. At time t1, valid='1', so that valid value D0 is output to the data signal, however, no data is fetched into the data reception module, because enable='0'. At time t2, because valid='1' and enable='1', data value D0 is fetched and the data sending module outputs new data D1 until time t3.

Although, at time t3, data is fetched because valid='1' and enable='1', no new sending data exists in the data sending module in a following cycle, so that valid='0' is output. At time t4, the data reception module can fetch data and therefore, outputs enable='1'. However, because the data sending module has no data to be sent, it outputs valid='0', so that no data is fetched. At time t5, the data sending module outputs new data D2 and consequently, it outputs valid='1' and the data reception module outputs enable='1', so that the data is fetched.

Figure 9:
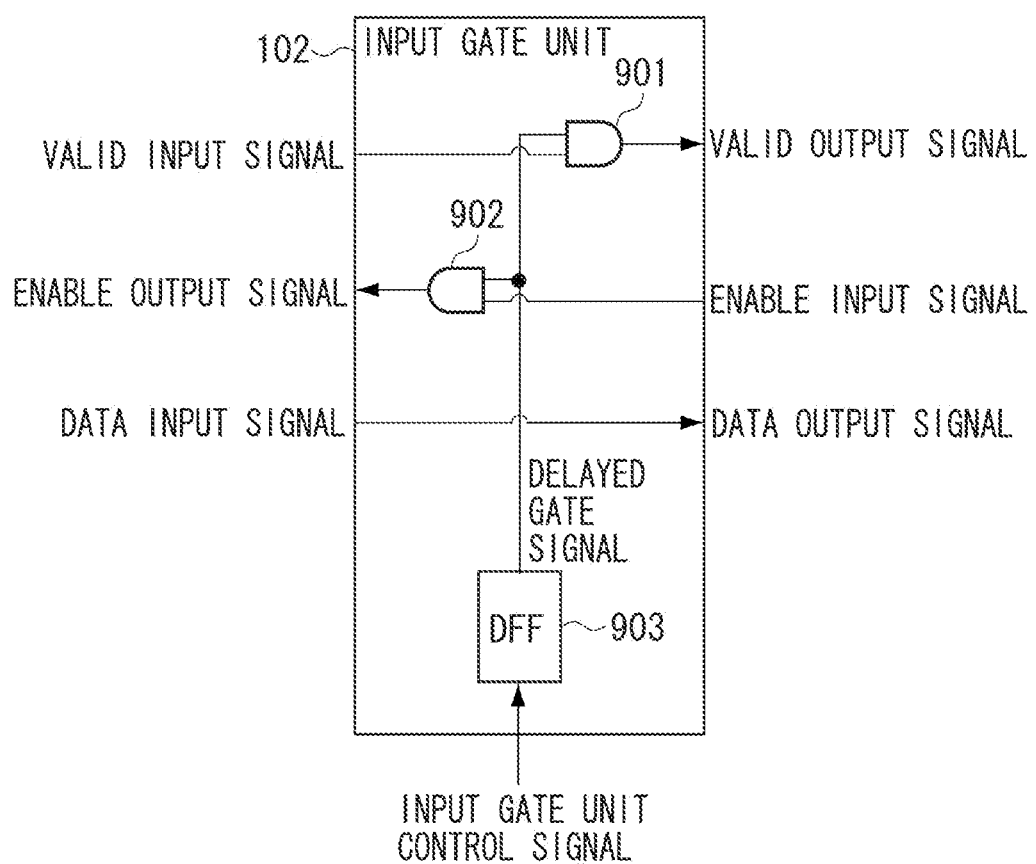
FIG. 9 is a diagram illustrating a detailed configuration of an input gate unit.

FIG. 9 is a block diagram illustrating a detailed configuration example of the input gate unit 102. The input gate unit 102 includes an AND circuit 901 which gates the valid signal, an AND circuit 902 which gates the enable signal and one-stage D flip-flop 903 which receives an input gate unit control signal. The input gate unit control signal is delayed by one cycle by the D flip-flop 903 and input to the AND circuits 901, 902 as a delayed gate signal. When the delayed gate signal value is '1', the valid signal value and the enable signal value are transmitted from input side to output side by the AND circuits 901, 902 as they are. On the other hand, when the delayed gate signal value is '0', the output of the valid signal and the enable signal is forced to be '0' by the AND circuits 901, 902. As described in FIG. 8, when valid='0' and enable='0', no data transfer by the bidirectional handshake is established, so that no data is transferred.

Figure 10:
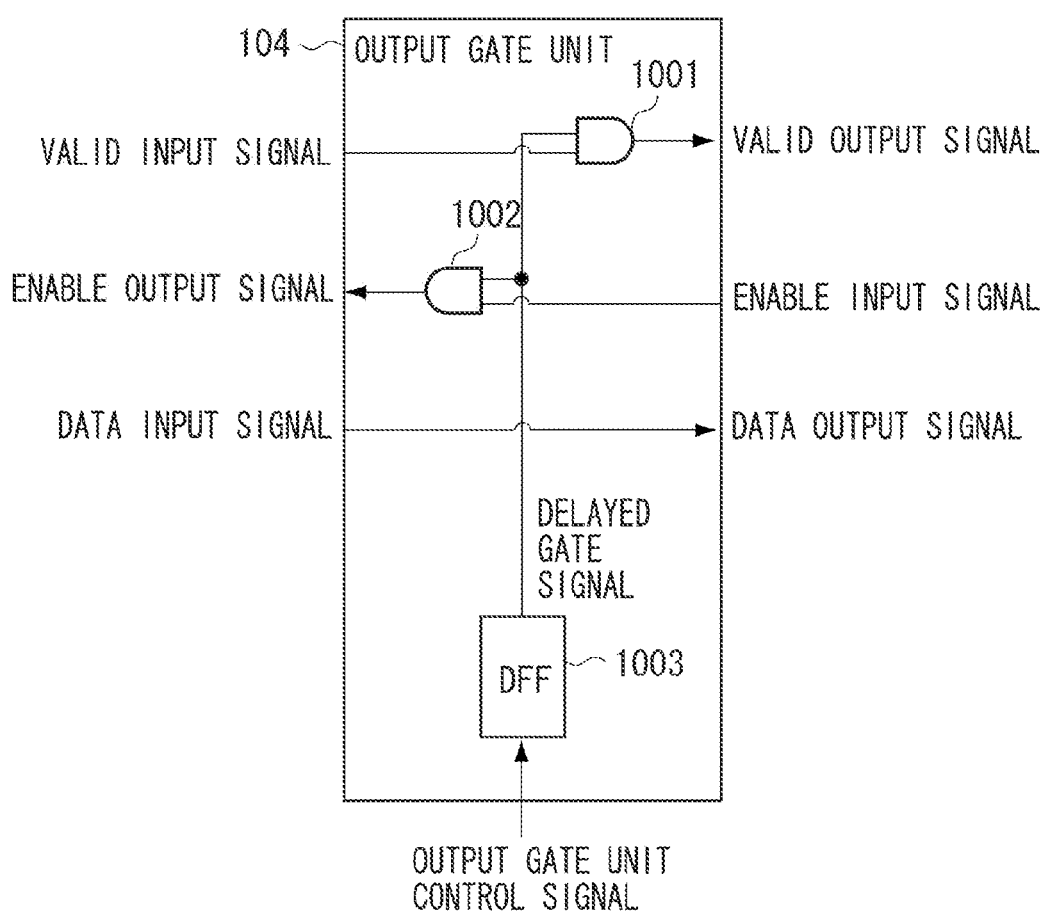
FIG. 10 is a diagram illustrating a detailed configuration of an output gate unit.

FIG. 10 is a block diagram illustrating a detailed configuration example of the output gate unit 104. The output gate unit 104 includes an AND circuit 1001 which gates the valid signal, an AND circuit 1002 which gates the enable signal and a one-stage D flip-flop 1003 which receives the output gate unit control signal. The output gate unit control signal is delayed by one cycle by the D flip-flop 1003 and input to the AND circuits 1001, 1002 as a delayed gate signal. When the delayed gate signal value is '1', the valid signal value and the enable signal value are transmitted from input side to output side by the AND circuits 1001, 1002 as they are. On the other hand, when the delayed gate signal value is '0', the output of the valid signal and the enable signal is forced to be '0' by the AND circuits 1001, 1002. As described in FIG. 8, when valid='0' and enable='0', no data transfer by the bidirectional handshake is established, so that no data is transferred.

Figure 11A:
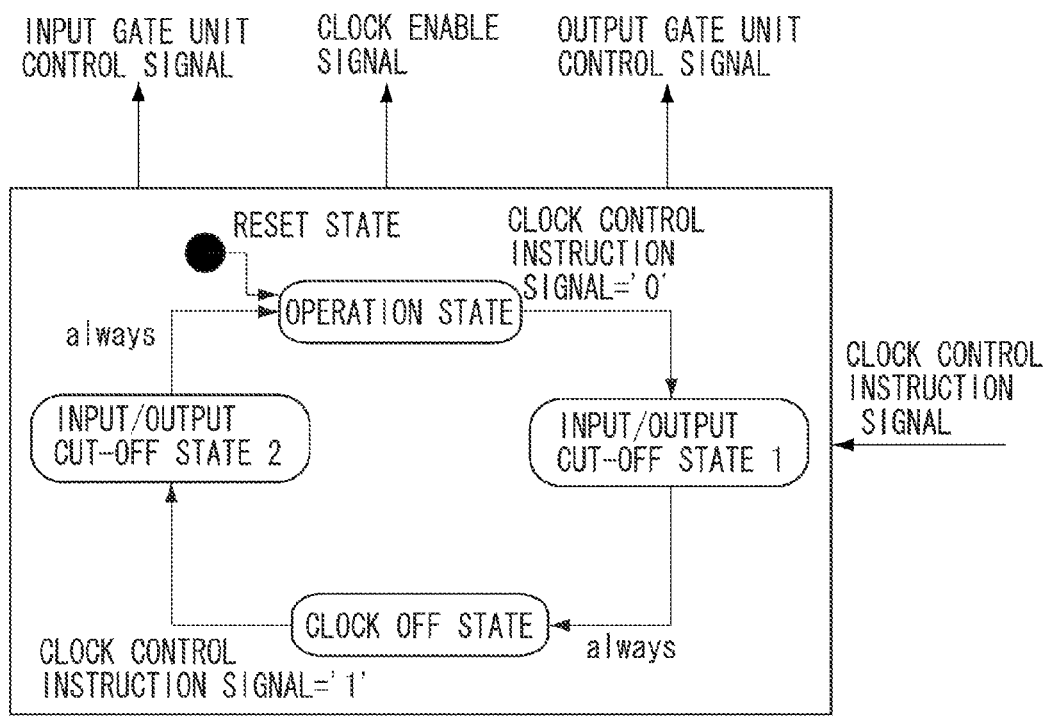

FIG. 11 is a diagram illustrating a state transition of the clock control state machine 702 of this exemplary embodiment and its output signal value. FIG. 11A indicates the state transition of the clock control state machine 702 and this clock control state machine 702 shows four states. FIG. 11B indicates output signal values when the clock control state machine 702 is in each state.

When the reset of the clock control state machine 702 is released, the clock control state machine 702 enters an operation state, so that the clock enable signal, the input gate unit control signal, and the output gate unit control signal are turned to '1' (ON). When in this operation state, '0' is input from the clock control instruction unit 107 as a clock control instruction signal for stopping the clock, the clock control state machine 702 enters the input/output cut-off state 1. In the input/output cut-off state 1, although the clock enable signal is '1' (ON), the input gate unit control signal and the output control unit control signal are '0' (OFF).

The clock control state machine 702 always enters clock-off-state in a cycle next to the input/output cut-off state 1. In the clock-off state, the clock enable signal, the input gate unit control signal, and the output gate unit control signal turn into '0' (OFF). In the clock-off state, when '1' is input from the clock control instruction unit 107 as a clock control instruction signal for starting the clock, the clock control state machine 702 enters input/output cut-off state 2. Although in the input/output cut-off state 2, the clock enable signal is '1' (ON), the input gate unit control signal and the output control unit control signal are '0' (OFF). The clock control state machine 702 always enters the operation state in a cycle next to the input/output cut-off state 2.

FIG. 12 is a timing chart illustrating a flow of the control of the operating clock of the feature calculation unit 103 of this exemplary embodiment. At time t1, the clock control instruction signal is '1' indicating clock-on, and the clock control state machine 702 is in the operation state. Therefore, all the clock enable signal, the input gate unit control signal and the output gate unit control signal are '1' and the delayed gate signal is also '1'. Thus, the clock is supplied to the feature calculation unit 103 and the handshake for input/output is valid, whereby enabling the data transfer.

Next, at time t2, the clock control instruction signal turns into '0' indicating clock-off. Corresponding to this, at next time t3, the clock control state machine 702 enters the input/output cut-off state 1. At time t3, although the input gate unit control signal and the output gate unit control signal are '0', the clock enable signal remains '1'. At next time t4, the clock control state machine 702 enters clock-off state. At this time, the delayed gate signals of the input gate unit 102 and the output gate unit 104 turn into '0' and consequently, the handshake for input/output of the feature calculation unit 103 is invalidated thereby cutting off the data transfer. Although the clock enable signal turns to '0' at this time, supply of the clock to the feature calculation unit is not yet stopped due to an influence of the one-stage flip-flop which receives the clock enable signal within the clock gating unit 701.

At next time t5, because the clock control instruction signal remains '0', the clock-off state continues, so that the supply of the clock to the feature calculation unit 103 is stopped at this time. After the input/output of the feature calculation unit 103 is forced to be cut off at time t4 the supply of the clock is stopped at time t5. Consequently, when clock-off is instructed, the supply of the clock can be stopped quickly while maintaining the matching in data transfer.

After that, at time t6, the clock control instruction signal turns into '1' indicating clock-on. Corresponding to this, at next time t7, the clock control state machine 702 enters the input/output cut-off state 2. At time t7, although the input gate unit control signal and the output gate unit control signal remain '0', the clock enable signal is changed to '1'. At next time t8, the clock control state machine 702 enters the operation state. Because the clock enable signal is '1' in a last cycle, at time t8, the supply of the clock to the feature calculation unit 103 is started. At time t8, although the input gate unit control signal and the output gate unit control signal are '1', the delayed gate signal at the input gate unit 102 and the output gate unit 104 remains '0'.

At time t9, because the clock control instruction signal remains '1', the operation state continues, so that the delayed gate signal is changed to '1'. When the delayed gate signal turns into '1', the handshake signal for input/output of the feature calculation unit 103 is validated thereby enabling the data transfer again. After the supply of the clock in the feature calculation unit 103 is started at time t8, the input and output are enabled at time t9. As a result, the operation can be restarted quickly after the clock-on is instructed while maintaining the matching in data transfer.

Between time t10 and time t15, the clock control instruction signal is '0' in only two cycles. At time t10, the clock control instruction signal turns into '0' and at time t11, the state of the clock control state machine turns to the input/output cut-off state 1 and at the same time, the input gate unit control signal and the output gate unit control signal turn to '0'. Further, at time t12, the state of the clock control state machine turns to the clock-off state and at the same time, the handshake signal for input/output of the feature calculation unit 103 is invalidated. At time t12, the clock enable signal turns to '0'. According to this operation example, at time t12, the clock control instruction signal turns to '1'.

At next time t13, the supply of the clock to the feature calculation unit 103 is stopped because the clock enable signal is '0' in a last cycle. As for the state of the clock control state machine, it receives clock control instruction signal='1', so that the state of the clock control state machine enters the input/output cut-off state 2 and the clock enable signal turns to '1'. At next time t14, the state of the clock control state machine enters the operation state, so that the input gate unit control signal and the output gate unit control signal turn to '1' and at the same time, the supply of the clock to the feature calculation unit 103 is restarted.

At next time t15, the delayed gate signals of the input gate unit 102 and the output gate unit 104 turn to '1', so that the input/output operation of the feature calculation unit 103 is restarted. As described above, the clock control state machine 702, the input gate unit 102, the output gate unit 104 and the clock gating unit 701 cooperate, and as a result, the supply of the clock can be stopped or restarted quickly following a change in the clock control instruction signal. In this first embodiment, input/output control timing and clock control timing is different, therefore, it is not necessary to match a delay of input/output control signal with a delay of clock control signal strictly. This will ease timing design of the circuit.

In the clock gating unit 701 of FIG. 7, the one-stage flip-flop for receiving the clock enable signal may not be individually provided as long as the matching in operation between the output control and the clock control indicated in this exemplary embodiment is maintained, or conversely, two or more stages of the flip-flop circuits may be individually provided. This is the same for the one-stage D flip-flop for receiving the input gate unit control signal in the input gate unit 102 and the one-stage D flip-flop for receiving the output gate unit control signal in the output gate unit 104. However, in that case, the state transition and the timing chart of the clock control state machine 702 are different from FIG. 11 and FIG. 12. Although this exemplary embodiment has been described using the image recognition apparatus 100, the data type does not have to be image, and the content of the data processing does not have to be recognition processing.

Figure 13:
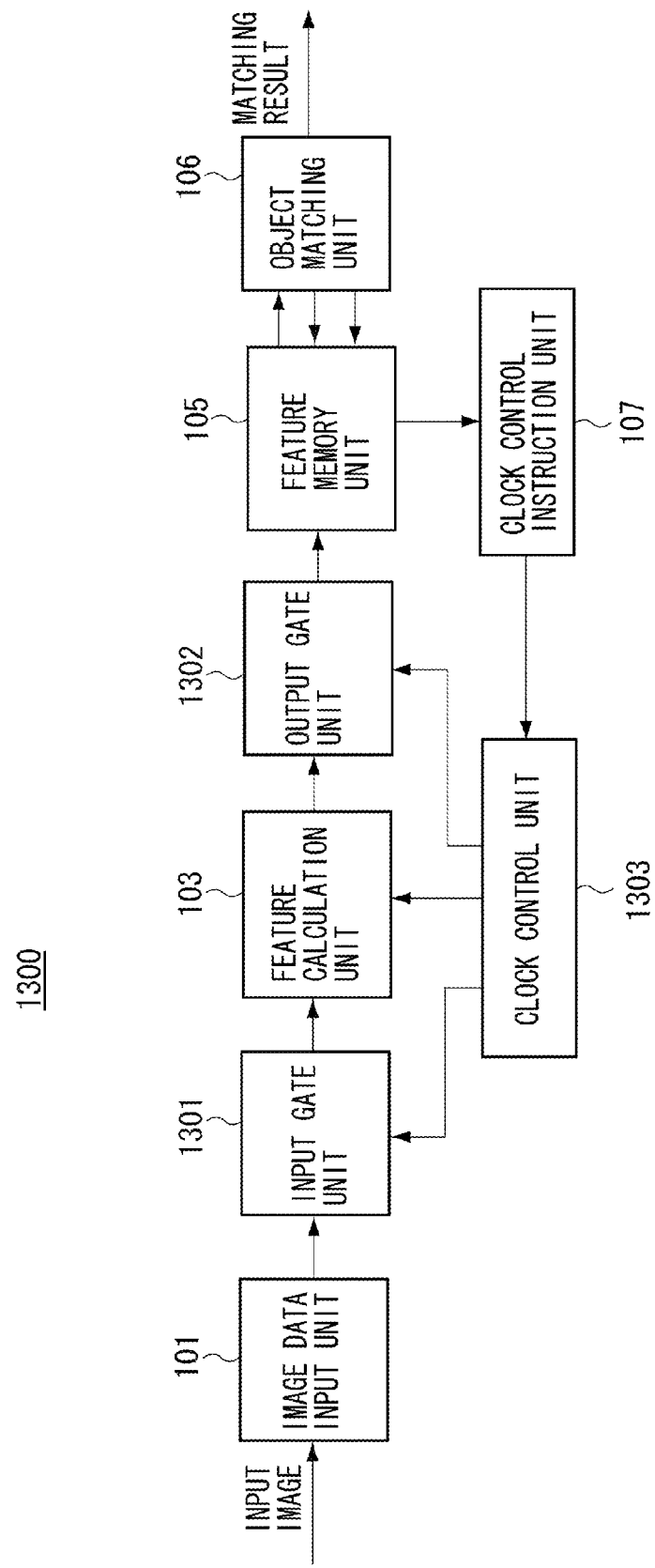
FIG. 13 is a diagram illustrating a functional configuration of an image recognition apparatus.

Hereinafter, the configuration of a second exemplary embodiment of the present invention will be described with reference to FIG. 13. FIG. 13 is a block diagram illustrating a functional configuration example of an image recognition apparatus 1300 for recognizing an object within an image. Like reference numerals are attached to the same components as the first exemplary embodiment. According to the present exemplary embodiment, an input gate unit 1301, an output gate unit 1302, and a clock control unit 1303 are different from the first exemplary embodiment. Other components are the same as the first exemplary embodiment and description thereof is omitted because a similar operation is carried out.

Figure 14:
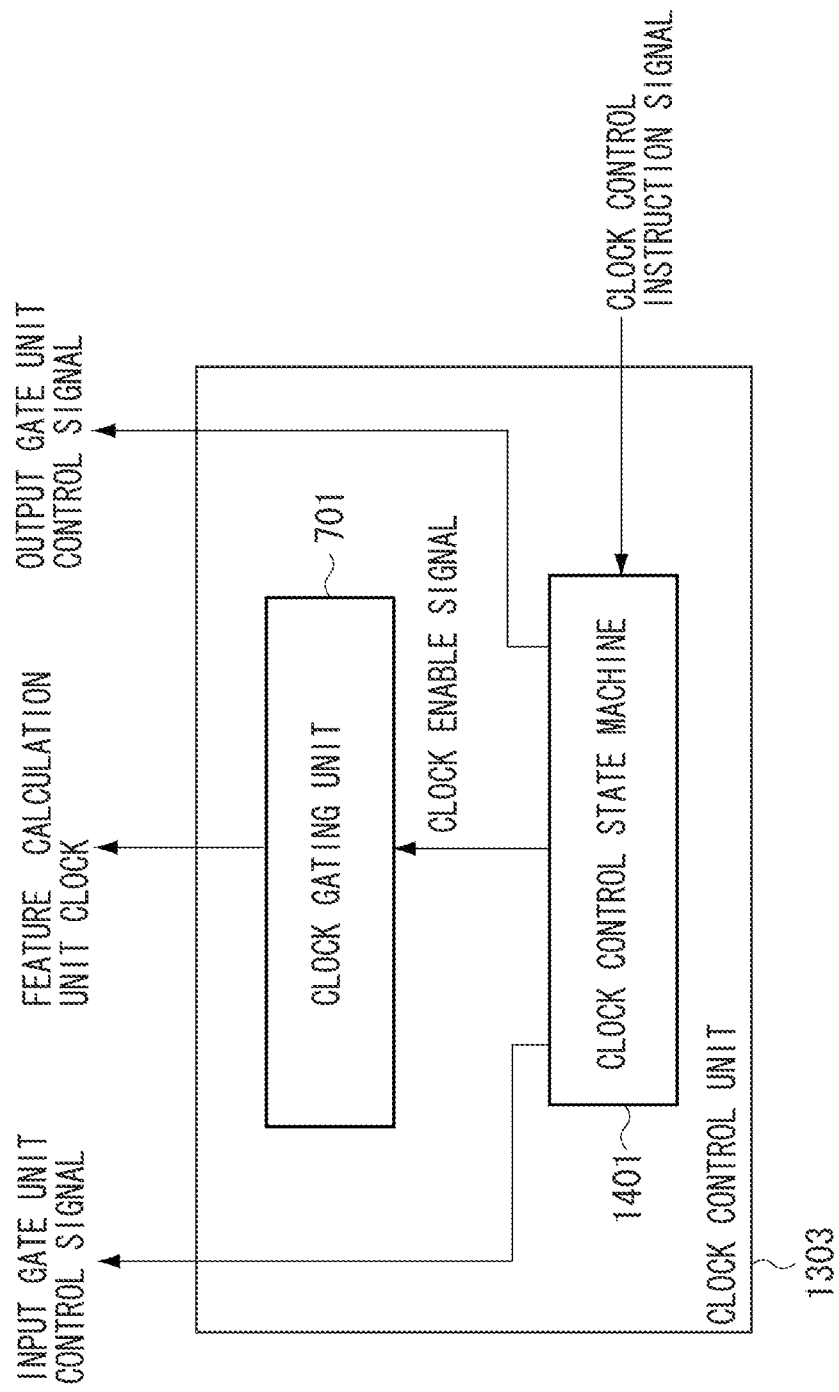
FIG. 14 is a diagram illustrating a detailed configuration of a clock control unit.

Next, the clock control unit 1303, the input gate unit 1301 and the output gate unit 1302 will be described with reference to FIGS. 14 to 16. FIG. 14 is a block diagram illustrating a detailed configuration example of the clock control unit 1303. The clock control unit 1303 includes a clock gating unit 701 and a clock control state machine 1401.

The clock control state machine 1401 is operated according to the clock control instruction signal and outputs a clock enable signal, an input gate unit control signal, and an output gate unit control signal, corresponding to its state. Like the first exemplary embodiment, the clock gating unit 701 receives the clock enable signal output from the clock control state machine 702 and turns on/off the supply of the clock to the feature calculation unit 103. According to this exemplary embodiment, it is presumed that the clock enable signal output from the clock control state machine 1401 is received and used by the one-stage flip-flop of the clock gating unit 701. Consequently, the clock enable signal is changed, so that on/off of the clock is changed after one cycle lapses.

Figure 15:
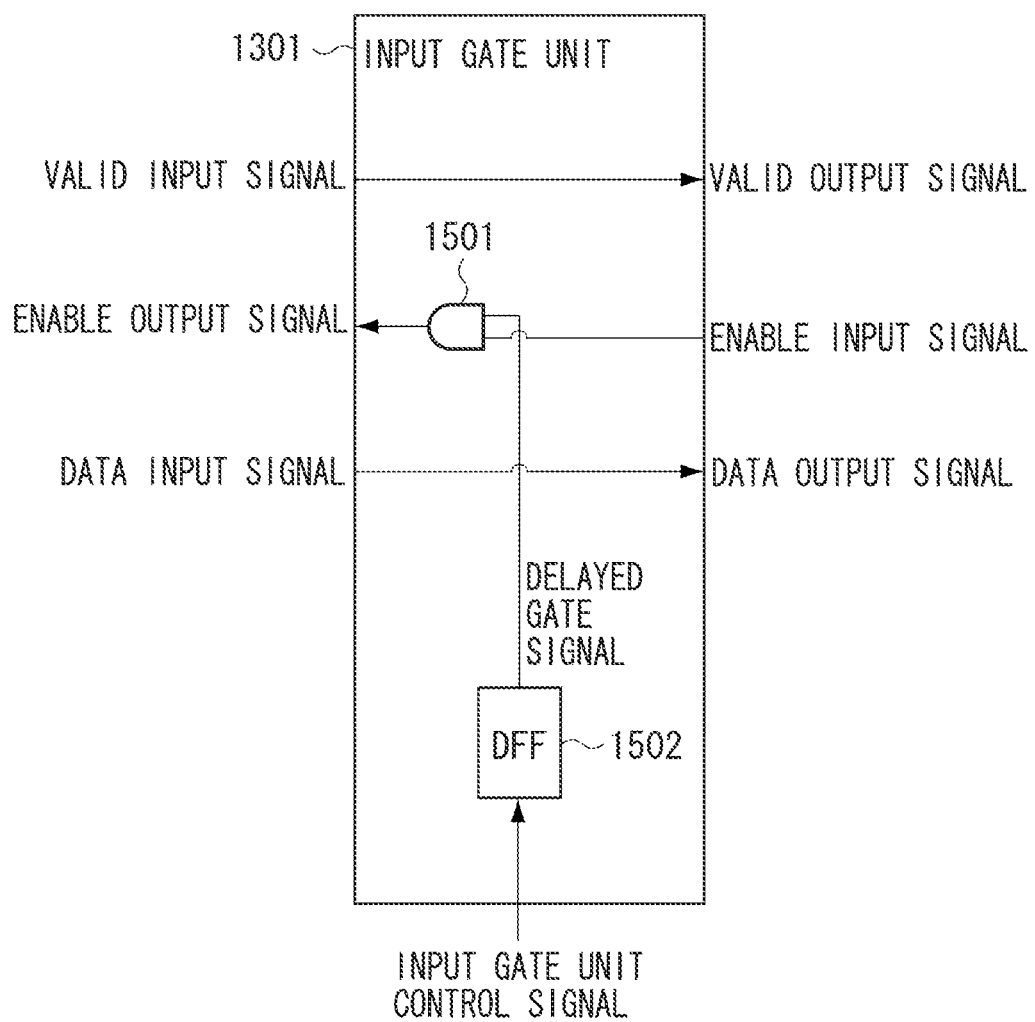
FIG. 15 is a diagram illustrating a detailed configuration of an input gate unit.

FIG. 15 is a block diagram illustrating a detailed configuration example of the input gate unit 1301. The input gate unit 1301 includes an AND circuit 1501 which gates the enable signal and a one-stage D flip-flop 1502 which receives an input gate unit control signal. The input gate unit control signal is delayed by one cycle by the D flip-flop 1502 and input to the AND circuits 1501 as a delayed gate signal. When the delayed gate signal value is '1', the enable signal value is transmitted from input side to output side as it is by the AND circuits 1501.

On the other hand, when the delayed gate signal value is '0', the output of the enable signal is forced to be '0' by the AND circuits 1501. Unlike the first exemplary embodiment, the valid signal input to the feature calculation unit 103 is transmitted as it is.

Figure 16:
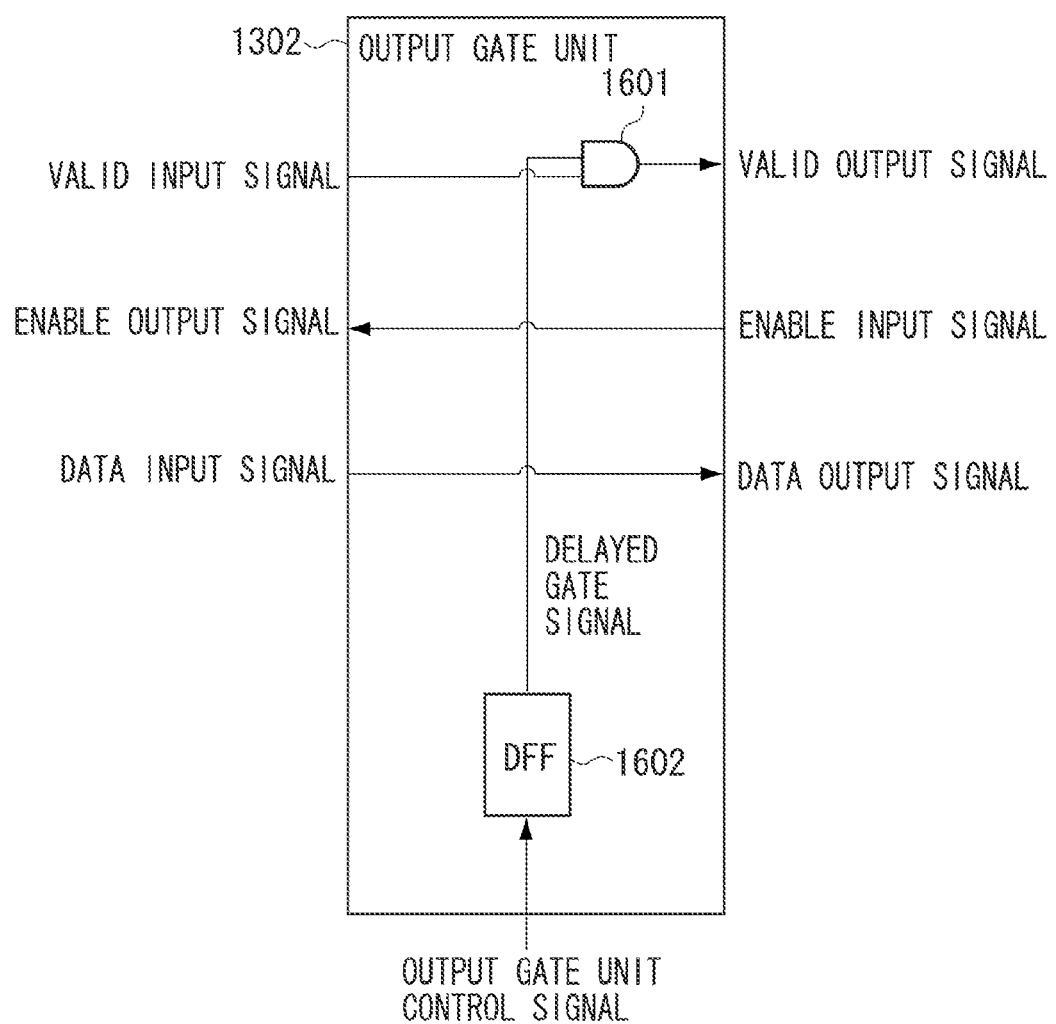
FIG. 16 is a diagram illustrating a detailed configuration of an output gate unit.

FIG. 16 is a block diagram illustrating a detailed configuration example of the output gate unit 1302. The output gate unit 1302 includes an AND circuit 1601 which gates the valid signal and a one-stage D flip-flop 1602 which receives the output gate unit control signal. The output gate unit control signal is delayed by one cycle by the D flip-flop 1602 and input to the AND circuits 1601 as a delayed gate signal. When the delayed gate signal value is '1', the valid signal value is transmitted from input side to output side as it is by the AND circuits 1601.

On the other hand, when the delayed gate signal value is '0', the output of the valid signal is forced to be '0' by the AND circuit 1601. Unlike the first exemplary embodiment, the enable signal input to the feature calculation unit 103 is transmitted as it is.

Figure 17A:
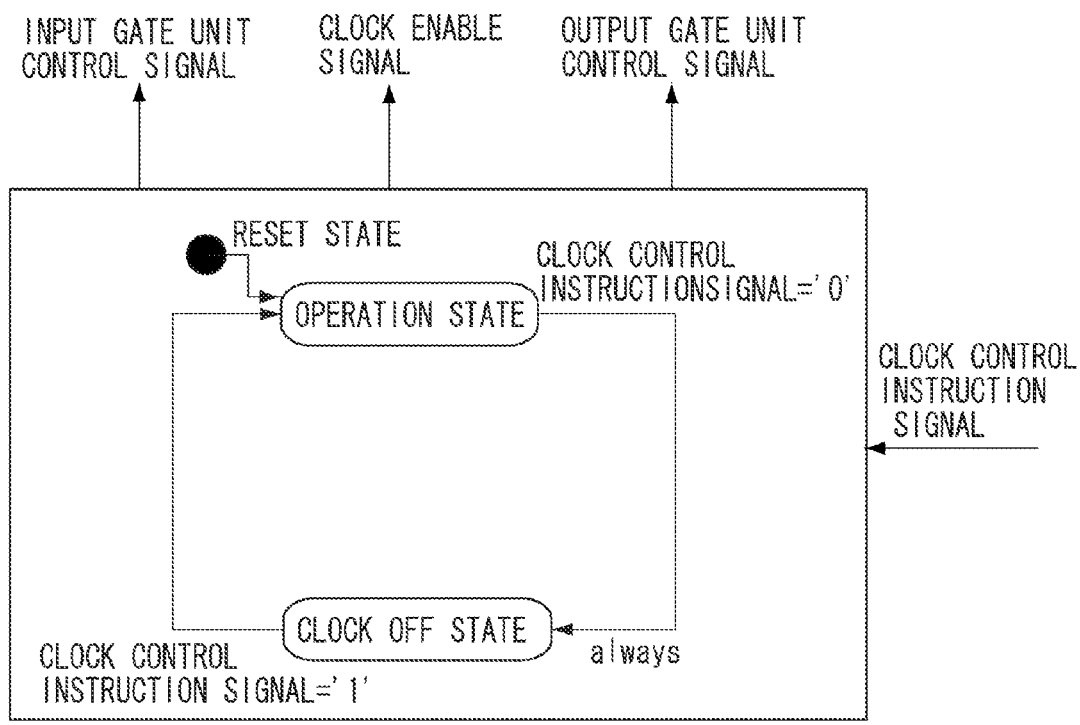

FIG. 17 is a diagram illustrating a state transition of the clock control state machine 1401 according to the exemplary embodiment and its output signal value. FIG. 17A indicates the state transition of the clock control state machine 1401 and this clock control state machine 1401 is composed of two states. FIG. 17B indicates output signal values when the clock control state machine 1401 is in each state.

When reset of the clock control state machine 1401 is released, the clock control state machine 1401 enters an operation state, so that the clock enable signal, the input gate unit control signal, and the output gate unit control signal are turned to '1' (ON). When in this operation state, '0' is input from the clock control instruction unit 107 as a clock control instruction signal for stopping the clock, the clock control state machine 1401 enters clock-off state. In the clock-off state, the clock enable signal, the input gate unit control signal, and the output control unit control signal are '0' (OFF). In the clock-off state, when '1' is input from the clock control instruction unit 107 as a clock control instruction signal for starting the clock, the state machine enters the operation state.

Figure 18:
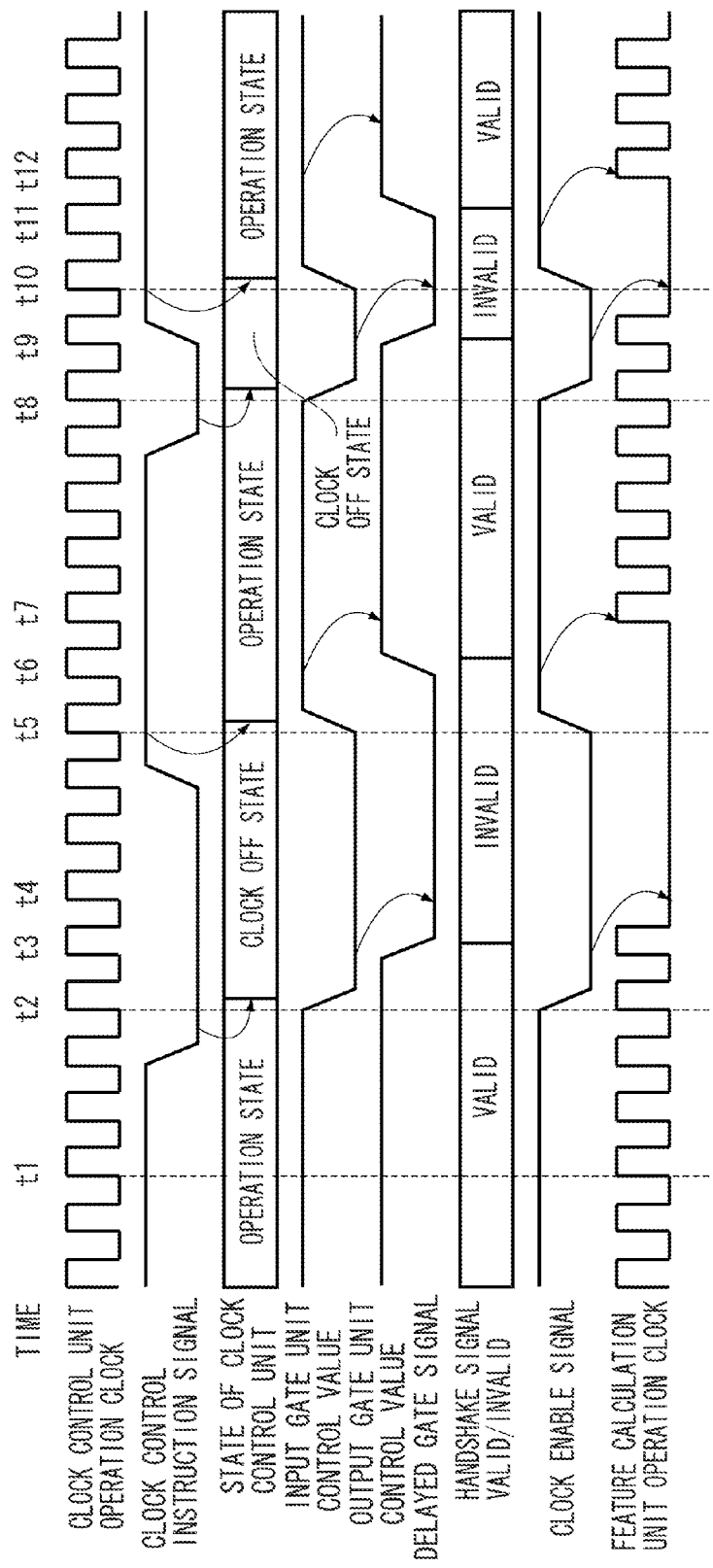
FIG. 18 is a diagram illustrating an operation flow of clock control.

FIG. 18 is a timing chart illustrating a flow of control of the operating clock of the feature calculation unit 103 according to the present exemplary embodiment. At time t1, the clock control instruction signal is '1' indicating clock-on and the clock control state machine 1401 is in the operation state. Therefore, all the clock enable signal, the input gate unit control signal, and the output gate unit control signal are '1' and the delayed gate signal is also '1'. Thus, the clock is supplied to the feature calculation unit 103 and the handshake for input/output is valid, whereby enabling the data transfer.

Next, at time t2, the clock control instruction signal turns into '0' indicating clock-off. Corresponding to this, at next time t3, the clock control state machine 1401 enters the clock-off state. At time t3, the input gate unit control signal, the output gate unit control signal, and the clock enable signal turn to '0' at the same time. At next time t4, the delayed gate signals of the input gate unit 1301 and the output gate unit 1302 turn into '0'. Consequently, the handshake signal output by the feature calculation unit 103 is invalidated, thereby cutting off the data transfer. At this time, the supply of the clock to the feature calculation unit 103 is stopped. Thus, even if the handshake signal (valid signal on the input side and enable signal on the output side) input to the feature calculation unit 103 is valid, the feature calculation unit 103 does not malfunction.

Assuming the handshake signal (valid signal on the input side, enable signal on the output side) input to the feature calculation unit 103 is valid and the supply of the clock to the feature calculation unit 103 is not stopped, the feature calculation unit 103 is active. Thus, there is a possibility that the feature calculation unit 103 may fetch input data or handle the output data as already output. However, because an input sending module and output receiving module of the feature calculation unit 103 considers that no input or output has been established due to effects of the input gate unit 1301 and the output gate unit 1302, the feature calculation unit 103 malfunctions. However in this embodiment, the input/output of the feature calculation unit 103 is forced to be cut off at time t4, one cycle before the clock supply is stopped. Accordingly, after the clock-off is instructed, the supply of the clock can be stopped quickly while maintaining the matching in data transfer.

After that, at time t5, the clock control instruction signal turns to '1' indicating clock-on. Corresponding to this, at next time t6, the clock control state machine 1401 enters the operation state. At time t6, the input gate unit control signal, the output gate unit control signal and the clock enable signal are changed to '1'. At next time t7, because the clock enable signal becomes '1' in a last cycle, the supply of the clock to the feature calculation unit 103 is started. At time t7, the delayed gate signals of the input gate unit 1301 and the output gate unit 1302 are changed to '1'. When the delayed gate signal turns to '1', the handshake signal output by the feature calculation unit 103 is validated, so that the data transfer is enabled again. Thus, the supply of the clock to the feature calculation unit 103 is started at time t7, and at the same time the input and output of the feature calculation unit 103 is enabled at time 7. Accordingly, the data transfer operation can be quickly restarted maintaining the matching in data transfer after the clock-on is instructed.

Between time t8 and time t12, the clock control instruction signal is '0' in only two cycles. At time t8, the clock control instruction signal turns into '0' and at next time t9, the state of the clock control state machine is changed to clock-off state and at the same time, the input gate unit control signal, the output gate unit control signal and the clock enable signal turn to '0'. Further, at time t10, the delayed gate signal turns to '0' and the handshake signal output by the feature calculation unit 103 is invalidated.

At the same time, the supply of the clock to the feature calculation unit 103 is stopped. Further, in this operating example, at time t10, the clock control instruction signal turns to '1'. As for the state of the clock control state machine 1401, at time t11, following clock control instruction signal='1', the state of the clock control state machine enters the operation state and the input gate unit control signal, the output gate unit control signal, and the clock enable signal turn to '1'. At next time t12, the delayed gate signal turns to '1', so that the handshake signal output by the feature calculation unit 103 is validated.

At the same time, the supply of the clock to the feature calculation unit 103 is restarted. Assuming that after the supply of the clock is restarted, the delayed gate signal turns to '1', the feature calculation unit 103 is activated just when the supply of the clock is restarted, so that there is a possibility that the feature calculation unit 103 might fetch the input data or consider that the output data has been already output. However, at this time, the input sending module and output receiving module of the feature calculation unit 103 considers that no input or output has been established due to effects of the input gate unit 1301 and the output gate unit 1302. Consequently, the feature calculation unit 103 malfunctions. However in this embodiment, the clock control state machine 1401, the input gate unit 1301, the output gate unit 1302, and the clock gating unit 701 cooperate in the above-described manner, the supply of the clock can be stopped and restarted quickly following a change in the clock control instruction signal.

Although according to this exemplary embodiment, the control of the input/output and the control of the clock are carried out at the same time, according to the first exemplary embodiment, the clock is turned off after the input and output is cut off and then, after the clock is turned on, the input and output is restarted, so that there is a difference in timing between the control of the input and output and the control of the clock. However, the present exemplary embodiment is advantageous in that the supply of the clock can be stopped and restarted more quickly than in the first exemplary embodiment.

In the clock gating unit 701 of FIG. 14, the one-stage flip-flop for receiving the clock enable signal may not be individually provided as long as the matching in operation between the input/output control and the clock control indicated in this exemplary embodiment is maintained, or conversely, two or more stages of the flip-flop circuits may be individually provided. This is the same for the one-stage D flip-flop for receiving the input gate unit control signal in the input gate unit 1301 and the one-stage D flip-flop for receiving the output gate unit control signal in the output gate unit 1302. In that case, the state transition and the timing chart of the clock control state machine 1401 are different from FIG. 17 and FIG. 18. Although in the present exemplary embodiment, the image recognition apparatus 1300 is described as an example, data type does not have to be image and the content of the data processing does not have to be recognition processing.

Figure 19:
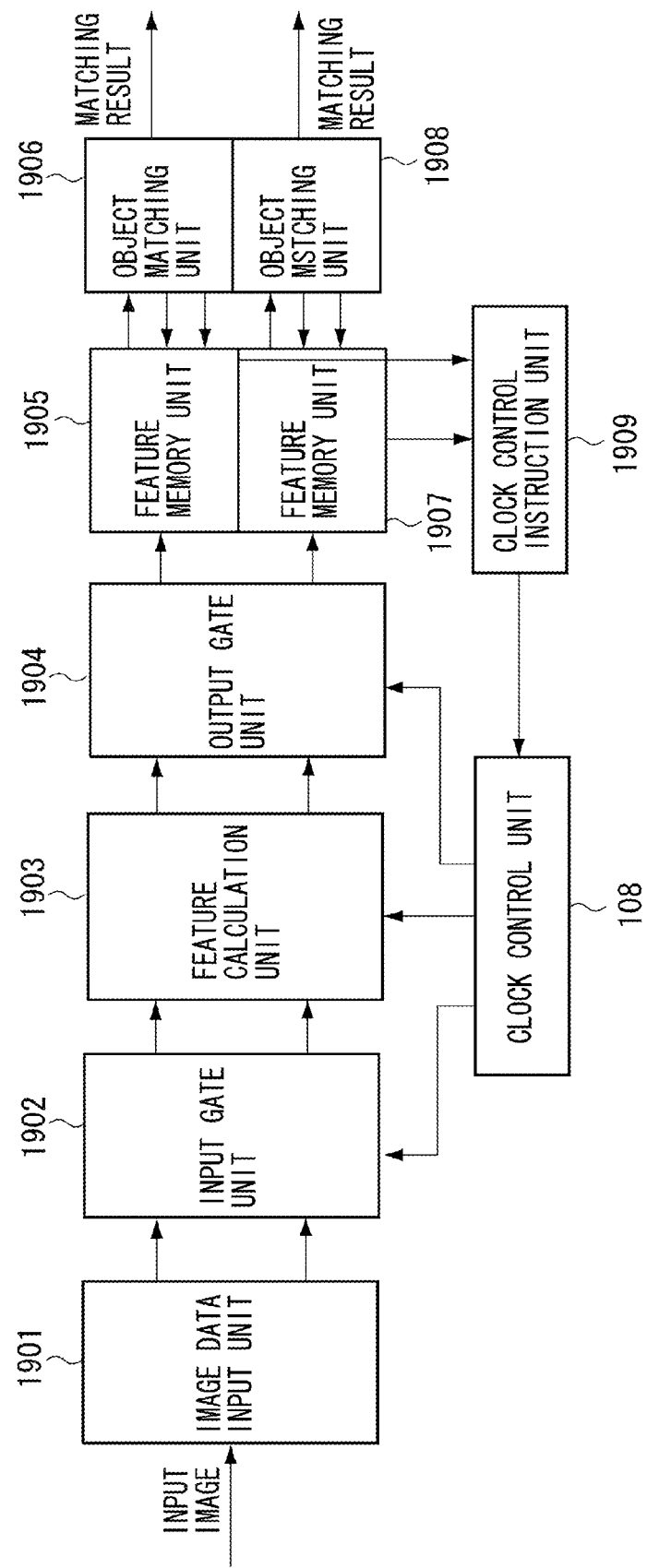
FIG. 19 is a diagram illustrating a functional configuration of an image recognition apparatus.

Hereinafter, a third exemplary embodiment of the present invention will be described with reference to FIG. 19. FIG. 19 is a block diagram illustrating a functional configuration example of an image recognition apparatus 1900 for recognizing an object within the image. Like reference numerals are attached to the same components as the first exemplary embodiment. In the present exemplary embodiment, an image input unit 1901, an input gate unit 1902, a feature calculation unit 1903, an output gate unit 1904, a feature memory unit 1905, 1907, an object matching unit 1906, 1908 and a clock control instruction unit 1909 are different from the first exemplary embodiment. Other components are the same as the first exemplary embodiment and description thereof is omitted because a similar operation is carried out.

According to this exemplary embodiment, in order to recognize two kinds of objects as to an input image at the same time, data path after the image data input unit 1901 is divided into two. The input gate unit 1902, the feature calculation unit 1903 and the output gate unit 1904 are configured to handle two data paths at the same time. The input gate unit 1902 and the output gate unit 1904 can at the same time validate and invalidate the two data paths with the input gate unit control signal and the output gate unit control signal.

Each pair of the feature memory units 1905, 1907 and the object matching units 1906, 1908 is prepared to recognize two kinds of objects at the same time and memory utilization information output from the two feature memory units 1905, 1907 are usually different from each other. The clock control instruction unit 1909 accepts the memory utilization information output from the two feature memory units 1905, 1907 and when any one of these memory units has no free space in the writable area, outputs the clock control instruction signal for stopping the clock of the feature calculation unit 1903.

The operation of each unit of this exemplary embodiment and the clock control operation are similar to the first exemplary embodiment. Although in this exemplary embodiment, the image recognition apparatus is described as an example, the data type does not have to be an image and the content of the data processing does not have to be recognition processing.

Other Embodiments

The present invention can be achieved also by executing following processing. According to this processing, software (program) for achieving the functions of the above-described exemplary embodiments is supplied to a system or an apparatus via a network or a variety of storage medium and then, a computer (CPU or MPU) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-280873 filed Dec. 16, 2010, which is hereby incorporated by reference herein in its entirety.

What is claimed is:

1. An apparatus comprising:
    a processing unit configured to process input data and output processed data, which are transferred by using a handshake signal;
    an input gate unit connected to an input of the processing unit and configured to enable or disable data input to the processing unit by using the handshake signal;
    an output gate unit connected to an output of the processing unit and configured to enable or disable data output from the processing unit by using the handshake signal;
    a control unit configured to control the handshake signal and a supply of clock to the processing unit,
    wherein the control unit controls the handshake signal to disable the data input and output to and from the processing unit and controls to stop the supply of the clock to the processing unit.

2. The apparatus according to claim 1,
    wherein the control unit controls the handshake signal to disable the data input and output to and from the processing unit and then controls to stop the supply of the clock to the processing unit.

3. The apparatus according to claim 1,
    wherein the control unit controls the handshake signal to disable the data input and output to and from the processing unit, and controls to stop the supply of the clock to the processing unit in the same cycle.

4. A method performed by a processor in an apparatus having memory, comprising:
    processing input data and outputting processed data, which are transferred by using a handshake signal;
    enabling or disabling the data input and output for the processing by using the handshake signal; and
    controlling the handshake signal and a supply of clock for the processing,
    wherein the controlling includes controlling the handshake signal to disable the data input and output for the processing, and controlling to stop the supply of the clock for the processing.

5. The method according to claim 4, wherein the controlling to stop the supply of the clock for the processing is after the controlling the handshake signal to disable the data input and output for the processing.

6. The method according to claim 4, wherein the controlling to stop the supply of the clock for the processing is in the same cycle with the controlling the handshake signal to disable the data input and output for the processing.

7. A non-transitory computer readable medium configured to store a program which causes a computer to execute each of the data processing method according to claim 4.

8. The non-transitory medium according to claim 7, wherein the method further comprises controlling to stop the supply of the clock for the processing after controlling the handshake signal to disable data input and output data for the processing.

9. The non-transitory medium according to claim 7, wherein the method further comprises the controlling to stop the supply of the clock for the processing in the same cycle with the controlling the handshake signal to disable the data input and output for the processing.

10. The apparatus according to claim 1, wherein the handshake signal includes a valid signal and an enable signal, and wherein the control unit controls at least one of the valid signal and the enable signal to disable the data input and output.

11. The apparatus according to claim 1, wherein the handshake signal is checked at each cycle to determine whether the data can be transferred to or from the processing unit.

12. The apparatus according to claim 1, further comprising an instruction unit configured to provide a clock control instruction to the control unit to instruct whether to provide or stop the supply of the clock,
    wherein the control unit controls the handshake signal and the supply of the clock based on the instruction provided from the instruction unit.

13. The apparatus according to claim 12, further comprising a memory storing the output data processed by the processing unit,
    wherein the instruction to instruct whether to provide or stop the supply of the clock depends on a memory utilization information received from the memory.

* * * * *